US007489991B2

(12) United States Patent
Bruelle-Drews

(10) Patent No.: US 7,489,991 B2
(45) Date of Patent: Feb. 10, 2009

(54) HEIGHT GENERATING SATELLITE NAVIGATION SYSTEM

(75) Inventor: Christian Bruelle-Drews, Hamburg (DE)

(73) Assignee: Harman International Industries, Incorporated, Northridge, CA (US)

( * ) Notice: Subject to any disclaimer, the term of this patent is extended or adjusted under 35 U.S.C. 154(b) by 250 days.

(21) Appl. No.: 10/543,220

(22) PCT Filed: Feb. 11, 2003

(86) PCT No.: PCT/US03/04118

§ 371 (c)(1),
(2), (4) Date: May 15, 2006

(87) PCT Pub. No.: WO2004/072583

PCT Pub. Date: Aug. 26, 2004

(65) Prior Publication Data

US 2006/0271288 A1      Nov. 30, 2006

(51) Int. Cl.
*G05D 1/00* (2006.01)

(52) U.S. Cl. .......................................... 701/10; 701/14

(58) Field of Classification Search ......... 701/200–214, 701/3–14; 342/357.02–357.06, 352
See application file for complete search history.

(56) References Cited

U.S. PATENT DOCUMENTS

| | | | |
|---|---|---|---|
| 4,954,833 A | 9/1990 | Evans et al. | 342/357 |
| 4,965,586 A | 10/1990 | O'Neill et al. | 342/357 |
| 5,646,857 A | 7/1997 | McBurney et al. | 364/449 |
| 6,016,118 A | 1/2000 | Jackson et al. | 342/357 |
| 6,055,477 A | 4/2000 | McBurney et al. | 701/207 |

FOREIGN PATENT DOCUMENTS

| | | |
|---|---|---|
| DE | 195 30 803 A1 | 2/1997 |
| EP | 0 762 269 A1 | 3/1997 |
| EP | 0 762 269 B1 | 12/2002 |
| JP | 11-166827 | 6/1999 |
| JP | 11-351886 | 12/1999 |
| JP | 2001-194169 | 7/2001 |
| JP | 2002-81950 | 3/2002 |

OTHER PUBLICATIONS

Patent Cooperation Treaty International Search Report, PCT/US03/04118, filed Feb. 11, 2003.
Examination Report from corresponding Canadian Application No. 2514116, dated Dec. 28, 2007.
European Search Report dated Apr. 25, 2008.
Japanese Office Action (JP 2004-568270), mailed Jul. 3, 2008, 5 pgs., translation included.

*Primary Examiner*—Richard M. Camby
(74) *Attorney, Agent, or Firm*—Brinks Hofer Gilson & Lione

(57) ABSTRACT

A vehicle satellite navigation system is provided for generating a standard height for a geographic location where the vehicle is located. The system may include a satellite receiver (100) that is capable of generating position data as a function of signals received from navigation satellites. The position data may include a longitude, a latitude, and a ellipsoidal height. The system may store undulation values for a geographic area in an undulation grid model (146) or in a digital map. The system may determine an approximate undulation value for the position, and calculate the standard height value for the position.

24 Claims, 3 Drawing Sheets

HEIGHT GENERATING SATELLITE NAVIGATION SYSTEM

BACKGROUND OF THE INVENTION

1. Technical Field

This invention relates generally to a navigation system, and more particularly to the generation of standard heights with a satellite navigation system.

2. Background of the Invention

The height generally depicted on topographic maps and physical markers is the standard height H. The standard height H indicates the height above mean sea level, and is determined by geodetic leveling. The standard height system may sometimes be referred to as the orthometric height system or the normal height system.

The National Geodetic Survey determines heights for the standard height system in the United States by taking physical measurements and using geodetic leveling. Government agencies in other countries perform similar functions, such as the State Survey Authority of the Federal State of Baden Württemberg (Landesvermessungsamt Baden Württemberg) in Germany, and the Federal Office of Topography (Bundesamt für Landestopographie) in Switzerland.

Heights obtained from satellite navigation systems, such as the Global Positioning Systems (GPS) of the United States or the Global Orbiting Navigation Satellite System (Glonass) of the Russian Federation, utilize a different height system than those obtained with geodetic leveling. Satellite navigation system data is generally processed to obtain an ellipsoidal height h. An ellipsoidal height h is a height above or below a simple ellipsoid model of the Earth, such as the World Geodetic System 1984 (WGS84) ellipsoid model of the Earth.

Because different height systems are used, the ellipsoidal height h indicated by a satellite navigation system for a location may differ by as much as 50 meters from the standard height H indicated on a printed map for the same location. This difference may present a problem when trying to reconcile the height provided by a printed map with the height provided by a satellite navigation system. Even though many vehicle navigation systems included digital maps, this difference in heights may be a problem when traveling either off-road or in an area outside of the digitally mapped area.

To convert from an ellipsoidal height h to a standard height H may require an undulation value N. The relationship between the ellipsoidal and standard height systems may be expressed by the equation: $h=H+N$. Accurate transformation between ellipsoidal height h and standard height H requires a high resolution undulation N model of comparable accuracy to the measured height data. Two examples of such models are the GEOID96 model in the United States and the Digitale Finite Element Höhenbezugsfläche (DFHBF) model in Germany.

It would be desirable to provide a satellite navigation system for use in a vehicle that indicates a standard height H for a location. It would be further desirable to provide a satellite navigation system for use in a vehicle that provides a standard height H for a section of a road. Additionally, it would be desirable to provide a satellite navigation system for use in a vehicle that provides a standard height H for a section of a road when the vehicle is on a road, and also provides standard height H for an off-road location when the vehicle is not on a road.

SUMMARY

A vehicle satellite navigation system is provided for generating a standard height for a geographic location where a vehicle is located. The system may include a satellite receiver, such as a GPS receiver or a Glonass receiver, that is capable of receiving radio signals from navigation satellites. The satellite receiver may generate position data for the location. The position data may include a longitude, a latitude, and an ellipsoidal height.

The system may also include a data storage device. The data storage device may store undulation values for a geographic area. The undulation values may be stored in an undulation grid model or in a digital map. The undulation values may be associated with points in the undulation grid model or with vectors representing sections of road in the digital map.

The system may further include a processor. The processor may be coupled to the satellite receiver and to the data storage device. The processor may receive the position data from the satellite receiver, and retrieve an undulation value associated with the position from the data storage device. The processor may also calculate the standard height value for the position. The standard height value for the position may be calculated as a function of the ellipsoidal height value and the undulation value.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale; emphasis is instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
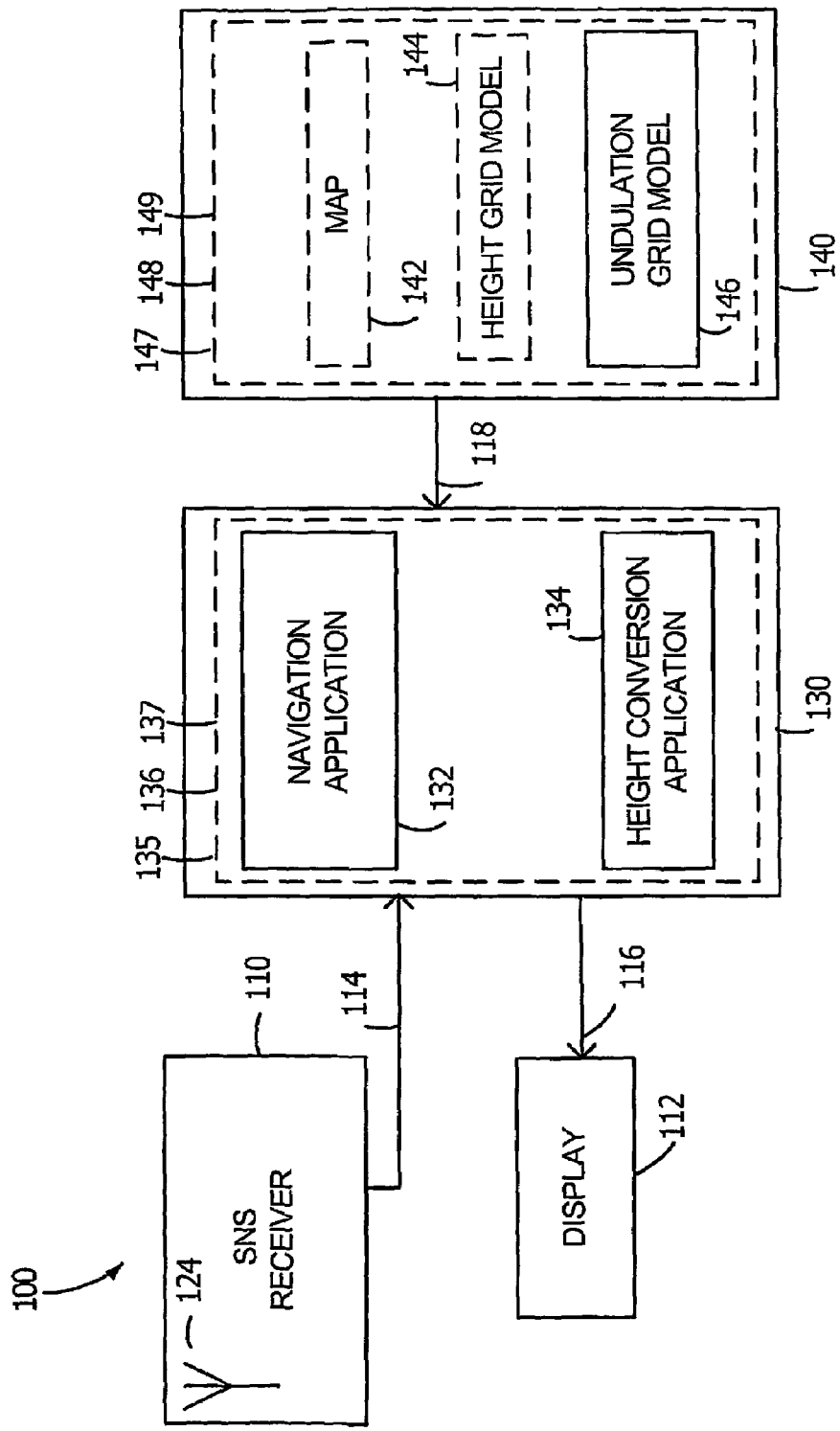
FIG. 1 is a functional block diagram of a vehicle satellite navigation system.

FIG. 1 is a system level block diagram of an exemplary vehicle satellite navigation system 100. The vehicle satellite navigation system 100 may include a satellite receiver 110, a processor 130, a display 112, and a data storage device 140. The satellite receiver 110 may receive radio signals from navigation satellites and determine a latitude x, longitude y, and ellipsoidal height h for a position P as a function of the radio signals. The vehicle navigation system 100 may be adapted for use with automobiles, trucks, buses, trains, motorcycles, bicycles, or the like.

The position P may be represented as P(x,y,h), where x is the latitude, y is the longitude, and z is the height of the position P. The height h of position P(x,y,h) may be an ellipsoidal height h, which is a height above or below a simple ellipsoid model of the Earth. As an example, the satellite receiver 110 may be a GPS receiver or a Glonass receiver.

The satellite receiver 110 may include an antenna 124. The antenna 124 may receive radio waves in the operating frequency range of the satellite receiver 110. For example, the antenna 124 may be a GPS antenna or a Glonass antenna.

The data storage device 140 may store undulation values and a digital map 142. Alternatively, the vehicle satellite navigation system 100 may lack map functionality, in which case digital map 142 may be omitted. The undulation values may be stored by the data storage device 140 in an undulation grid model 146 and/or as part of the digital map 142. The data storage device 140 may include a storage medium such as a hard disk drive, a compact disc drive, a digital versatile disc drive, a minidisk drive, a floppy disk drive, a smart card drive, a memory stick drive, a memory cartridge drive, a flash memory drive, or the like.

The undulation grid model 146 may contain a set N(X,Y) of height undulation values for positions P(X,Y) in a geographic area, where X is a set of latitudes x in the area, and Y is a set of longitudes y in the area. Each undulation value N(x,y) may be associated with a unique combination of members of sets X and Y such that N(x,y) represents an undulation value for position P(x,y). The undulation values in the set N(X,Y) may contain data derived from, for example, the GEOID96 model or the DFHBF model.

As is common in vehicle navigation systems, the digital map 142 may include a vector representation for a system of roads. The digital map 142 may contain a number of vectors $V_X$, where each vector $V_X$ represents a section of road $S_X$. The location and height of a section of road $S_X$ is generally static. Therefore, rather than dynamically calculating an undulation value $N_X$ for a section of road $S_X$, the undulation value $N_X$ for the section of road S, stored in the digital map 142 may be calculated in advance, for example, during "preprocessing" of the digital map 142. For each section of road $S_X$, a value $N_X$ may be stored in the digital map 142 as an additional attribute of the vector $V_X$ representing the section of road $S_X$.

The processor 130 may identify and retrieve an undulation value for a position P(x,y) and generate a standard height for the position P(x,y). The processor 130 may include a navigation application 132 and a height conversion application 134. The navigation application 132 may include instructions for causing the processor 130 to identify and retrieve an undulation value $N_X$ from a vector $V_X$ based on a current position P(x,y). The navigation application 132 may also include instructions for causing the processor 130 to generate a standard height for the position as a function of $N_X$.

The processor 130 may include a microprocessor or a microcontroller, such as an Intel Pentium microprocessor, a Sun SPARC microprocessor, a Motorola microprocessor, or the like. Although shown as separate from the data storage device 140, the processor 130 and the data storage device 140 may alternatively be integrated into a single unit.

The navigation application 132 and a height conversion application 134 may be stored in a memory 135 of the processor 130. Alternatively, an article of manufacture 136 may tangibly embody the navigation application 132 and the height conversion application 134. The article of manufacture 136 may be a program storage device, such as a magnetic storage device, an optical storage device, or an electromagnetic storage device. For example, the article of manufacture 136 may be a compact disc, a digital versatile disc, a Minidisc, a floppy disk, a smart card, a memory stick, a memory cartridge, a flash memory device, or the like.

Alternatively, an electromagnetic signal 137 may embody the navigation application 132 and the height conversion application 134. The electromagnetic signal 137 may be a modulated carrier wave propagated through space, a light wave propagated through space or a fiber optic conductor, an electrical signal propagated through an electrical conductor, or the like. For example, the electromagnetic signal 137 may be a wireless local area network signal propagated by an access point to the vehicle satellite navigation system 100. Additionally, the electromagnetic signal 137 may be a Bluetooth signal propagated a Bluetooth enabled computer or a third generation (3G) signal propagated by a wireless service provider. Furthermore, the electromagnetic signal 137 may be a light wave emitted by a light emitting diode or a laser of a fiber optic capable computer. The electromagnetic signal 137 may also be an electrical signal from a computer conforming to a communications standard, such as an RS-232 signal, RS-488 signal, an IEEE 802 signal, a IEEE 1394, or the like.

The navigation application 132 and the height conversion application 134 may be embodied as one or more programs of instructions executable by the processor 130. The processor 130 may execute the one or more programs of instructions directly from the article of manufacture 136 or the electromagnetic signal 137. Alternatively, the processor may read the instructions from the article of manufacture 136 or the electromagnetic signal 137 and store the instructions in the memory 135 prior to execution.

Similarly, the undulation values stored by the data storage device 140 may be stored in a memory 147, read from an article of manufacture 148, or read from an electromagnetic signal 149. For example, the data storage device 140 may acquire the digital map 142 and/or the undulation grid model 146 via the electromagnetic carrier wave 149 upon entering a geographic area. The electromagnetic carrier wave 149 may be the electromagnetic signal 137, or an electromagnetic signal similar in nature to those discussed above in regards to the electromagnetic signal 137.

Additionally, the article of manufacture 148 and the article of manufacture 136 may be the same physical device. Likewise, the electromagnetic signal 137 and the electromagnetic signal 149 may be the same signal. Alternatively, there may be more than one physical device comprising article of manufacture 148 or article of manufacture 136. There may also be more than one signal comprising electromagnetic signal 137 or electromagnetic signal 149.

In operation, the satellite receiver 110 may receive radio waves (signals) from navigation satellites and generate a current position P(x,y,h) of the vehicle satellite navigation system 100. The height h of the position P(x,y,h) may be an ellipsoidal height h. The processor 130 may convert the ellipsoidal height h of the position P(x,y,h) to a standard height H for the position P(x,y,h).

Figure 2:
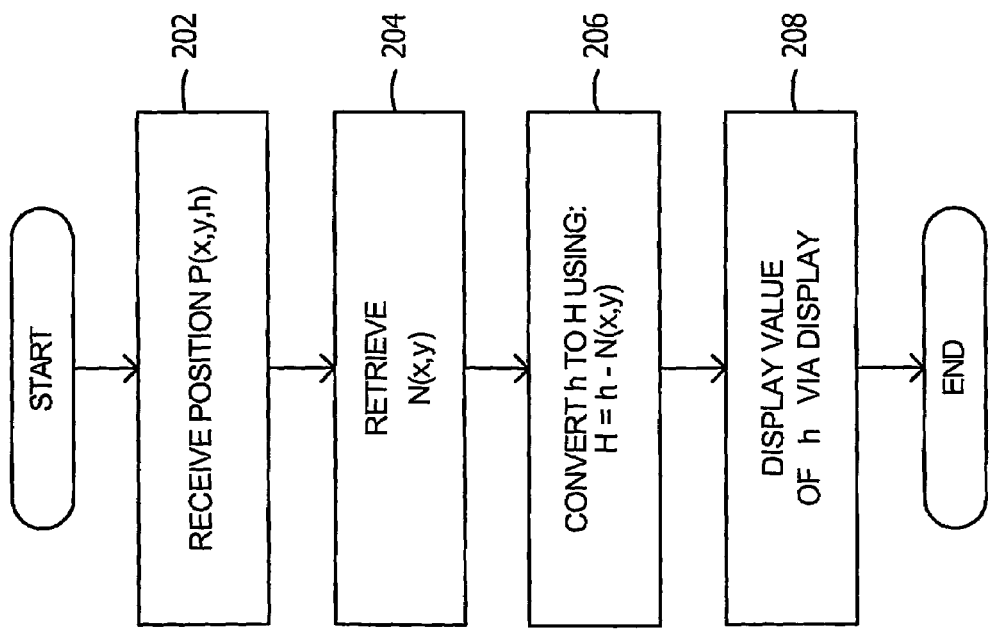
FIG. 2 is a flow chart illustrating the operation of a processor of a satellite navigation system when executing the instructions of a height conversion application.

FIG. 2 is a flow chart illustrating the operation of the processor 130 of a when executing the instructions of the height conversion application 134. At step 202, a position signal indicating the position P(x,y,h) may be received by the processor 130 from the satellite receiver 110 via a signal path 114.

At step 204, the processor 130 may retrieve the undulation value N(x,y) substantially corresponding to the latitude x and the longitude y of the position P(x,y,h) from the undulation grid model 146. At step 206, the processor 130 may convert the ellipsoidal height h of position P(x,y,h) to a standard height H. The processor 130 may calculate the standard height H by subtracting the undulation value N(x,y) from the ellipsoidal height h. The undulation value N(x,y) may be expressed as a positive or negative number, so the term "subtracting" as used herein may refer to adding a negative value, as well as to subtracting a positive value.

At step 208, the processor 130 may generate a display signal indicating the standard height H for the position P(x,y,h). The processor 130 may transmit the display signal to the display 112 via signal path 116. In this manner, the standard height H for the position P(x,y,h) may be communicated to the user.

Figure 3:
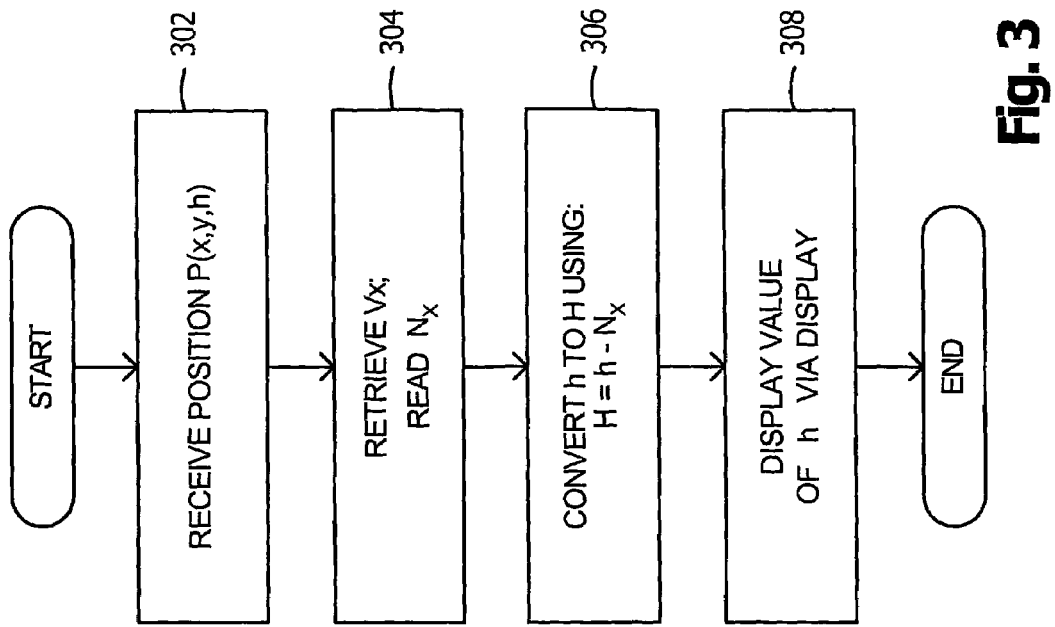
FIG. 3 is a flow chart illustrating the operation of a processor of a satellite navigation system when executing the instructions of a navigation application.

FIG. 3 is a flow chart illustrating the operation of the processor 130 when executing instructions are included in the navigation application 132. At step 302, a position signal indicating the position P(x,y,h) may be received by the processor 130 from the satellite receiver 110 via a signal path 114. At step 304, the processor 130 may determine and retrieve a vector $V_X$ that represents a section of road $S_X$ near to the position P(x,y,h), and read an undulation value $N_X$ from the vector $V_X$. During preprocessing of the map 142, any section of road $S_X$ that exists in more than one grid square may be divided into multiple sections so that each vector $V_X$ may include only one undulation value $N_X$.

At step 306, the processor 130 may convert the ellipsoidal height h of position P(x,y,h) to a standard height H. The processor 130 may calculate the standard height H by subtracting the undulation value $N_X$ from the ellipsoidal height h. At step 308, the processor 130 may generate a display signal indicating the standard height H for the position P(x,y,h). The processor 130 may transmit the display signal to the display 112 via signal path 116. In this manner, the standard height H for the position P(x,y,h) may be communicated to the user.

Figure 4:
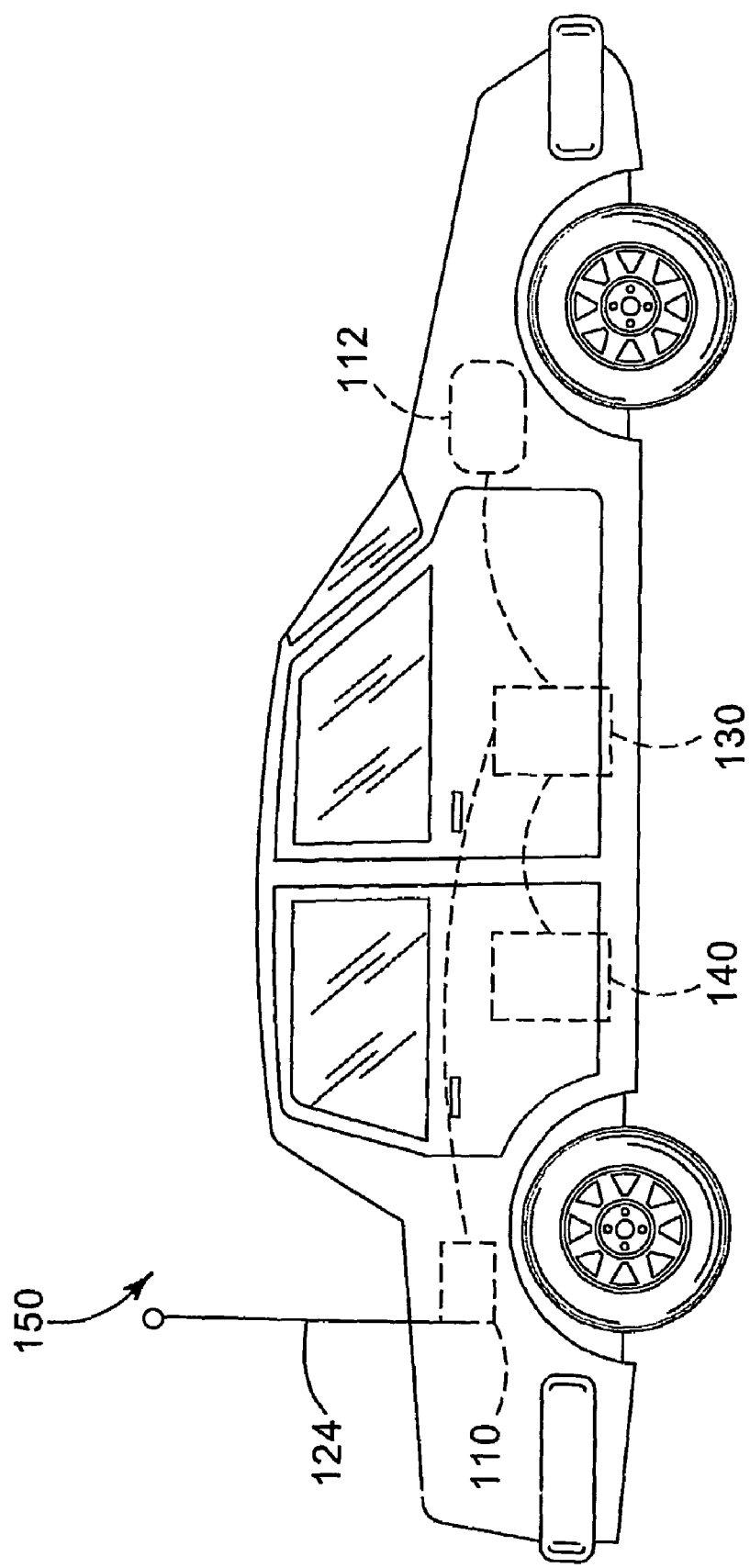
FIG. 4 shows a vehicle having a vehicle satellite navigation system.

In operation, the processor 130 may execute the navigation application 132 when the current position P(x,y,h) is "on road," or within very near proximity to a road. However, when the current position P(x,y,h) is "off road," or not in near proximity to a road, the processor 130 may execute the height conversion application 134. This allows for maps and the like to be displayed when available, and a standard height H to be displayed during off-road operation FIG. 4 shows an illustrative vehicle 150 having an exemplary vehicle satellite navigation system 100. Coupled to the vehicle 150 are the satellite receiver 110, the processor 130, the display 112, and the data storage device 140. The display 112 is preferably mounted in the passenger compartment in a location viewable by a driver of the vehicle 150, such as the dash.

The processor 130 and the data storage device 140 may be mounted, for example, behind the dash or under seats of the vehicle 150. Alternatively, where the data storage device 140 utilizes some form of removable media, such as a compact disc, the data storage device 140 may preferably be mounted in a location accessible by the driver of the vehicle 150, such as in the dash.

The satellite receiver 110 may be mounted, for example, in the trunk of the vehicle 150. The antenna 124 may be mounted outside the vehicle, or inside the vehicle 150 in a location with an unobstructed radio frequency view of the sky. FIG. 4 is merely illustrative, and is not intended to limit the claimed invention in any way.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A vehicle satellite navigation system for determining a standard height for a position, the system comprising:
    a satellite receiver operable to receive radio signals from navigation satellites and generate, as a function of the radio signals, a position for the vehicle;
    a data storage device operable to store a digital map representing a section of road as a vector that includes an undulation value for the position; and
    a processor coupled to the satellite receiver and to the data storage device;
    where the position has an ellipsoidal height value and the processor is operable to generate a standard height value for the position as a function of the ellipsoidal height value and the undulation value.

2. The vehicle satellite navigation system of claim 1 comprising a height grid model that includes the undulation value, where the data storage device includes the height grid model.

3. A vehicle satellite navigation system for determining a standard height for a position, the system comprising:
    a satellite receiver operable to receive radio signals from navigation satellites and generate, as a function of the radio signals, a position for the vehicle;
    a data storage device operable to store a digital map representing a road as a vector and a height grid model that includes an undulation value for the position; and
    a processor coupled to the satellite receiver and to the data storage device;
    where the position has an ellipsoidal height value and the processor is operable to generate a standard height value for the position as a function of the ellipsoidal height value and the undulation value.

4. A method for determining a standard height for a vehicle position, the method comprising:
    receiving radio signals from navigation satellites;
    determining a longitude, a latitude, and an ellipsoidal height for a vehicle position as a function of the radio signals;
    retrieving a first undulation value stored in a digital map in association with a section of road stored as a vector in the digital map in response to correspondence between the vehicle position and a position of the section of road;
    retrieving a second undulation value stored in the digital map in association with the latitude and the longitude in response to an absence of any correspondence between the vehicle position and the position of the section of road; and
    generating a standard height for the vehicle position as a function of the ellipsoidal height value and one of the first undulation value or the second undulation value.

5. The method of claim 4, where the second undulation value includes a set of undulation values for an area.

6. The method of claim 5, where retrieving the second undulation value includes identifying an undulation value from the set of undulation values stored in the digital map based on the longitude and latitude of the vehicle position.

7. The method of claim 4, further including the step of storing the first undulation value or the second undulation value for later retrieval.

8. The method of claim 7, where the step of storing the first undulation value or the second undulation value for later retrieval includes storing an undulation grid model having a plurality of second undulation values, where each of the second undulation values in the undulation grid model is associated with a particular latitude and longitude.

9. The method of claim 4, where generating a standard height for the vehicle position includes subtracting the first undulation value or the second undulation value from the ellipsoidal height.

10. The method of claim 4, where generating a standard height for the vehicle position includes adding the first undulation value or the second undulation value to the ellipsoidal height.

11. A method for determining a standard height for a vehicle position, the method comprising:
    storing a digital map;
    receiving radio signals from navigation satellites;
    determining a longitude, latitude, and ellipsoidal height for the vehicle position as a function of the radio signals;
    retrieving, based on the longitude and the latitude of the vehicle position, an undulation value from a set of undulation values stored in the digital map; and
    generating a standard height for the vehicle position as a function of the ellipsoidal height and the undulation value.

12. The method of claim 11, where storing the digital map includes storing a vector that represents a section of road, and associating an undulation value of the set of undulation values with the vector.

13. The method of claim 11, where storing the digital map includes storing a height grid model that includes the set of undulation values.

14. The method of claim 13, where storing the digital map includes associating a subset of undulation values from the set of undulation values with the vector.

15. The method of claim 11, where generating a standard height for the position includes combining the undulation value with the ellipsoidal height.

16. An article of manufacture comprising:
    a program storage device having a program of instructions embodied therein for causing a vehicle navigation system to determine a standard height for a vehicle position, the program of instructions in the article of manufacture comprising:
    instructions to cause the vehicle navigation system to store a digital map for an area, where the digital map includes a set of undulation values;
    instructions to cause the vehicle navigation system to receive radio signals from navigation satellites;
    instructions to cause the vehicle navigation system to determine a longitude, a latitude, and an ellipsoidal height for the vehicle position as a function of the radio signals;
    instructions to cause the vehicle navigation system to retrieve an undulation value from the stored digital map; and
    instructions to cause the vehicle navigation system to generate a standard height for the vehicle position as a function of the ellipsoidal height and the undulation value.

17. The article of manufacture of claim 16, where the program storage device is selected from the group comprising a magnetic storage device, an optical storage device, and an electromagnetic storage device.

18. A computer program product comprising:
    a data storage device including a computer readable medium having a program of instructions embodied therein for causing a vehicle navigation system to determine a standard height for a vehicle position, the program of instructions comprising:
    instructions to store a digital map in the data storage device;
    instructions to receive radio signals from navigation satellites;
    instructions to determine a longitude, a latitude, and an ellipsoidal height for the vehicle position as a function of the radio signals;
    instructions to retrieve an undulation value stored in conjunction with the digital map; and
    instructions to generate a standard height for the vehicle position as a function of the ellipsoidal height and the undulation value.

19. The computer program product of claim 18, where the instructions to store the digital map include instructions to store a vector that represents a section of road, and instructions to associate the undulation value with the vector.

20. A vehicle satellite navigation system for determining a standard height for a position, the system comprising:
    a satellite receiver operable to receive radio signals from navigation satellites and generate, as a function of the radio signals, a position for the vehicle;
    a means for storing a digital map that includes an undulation value for the position;
    a means for embodying a program of instructions; and
    a processor coupled to the satellite receiver, to the means for storing, and to the means for embodying;
    where the position has an ellipsoidal height value and the processor is operable to execute the program of instructions to generate a standard height value for the position as a function of the ellipsoidal height value and the undulation value.

21. A vehicle satellite navigation system for determining a standard height for a position, the system comprising:
    a satellite receiver operable to receive radio signals from navigation satellites and generate, as a function of the radio signals, a position for a vehicle;
    a data storage device operable to store a first undulation value associated with a section of road in near proximity to the position, or a second undulation value associated with the position when no section of road is in near proximity to the position; and
    a processor coupled to the satellite receiver and to the data storage device;
    where the position has an ellipsoidal height value and the processor is operable to generate a standard height value for the position as a function of the ellipsoidal height value and one of the first undulation value or the second undulation value.

22. The vehicle satellite navigation system of claim 21, comprising a digital map representing the section of road as a vector that includes the first undulation value, where the data storage device includes the digital map.

23. The vehicle satellite navigation system of claim 21, comprising a height grid model that includes the first undulation value or the second undulation value, where the data storage device includes the height grid model.

24. The vehicle satellite navigation system of claim 21, comprising a digital map representing a road as a vector and a height grid model that includes the first undulation value, where the data storage device includes the digital map and the height grid model.

* * * * *